(12) United States Patent
Melle et al.

(10) Patent No.: US 11,014,116 B2
(45) Date of Patent: May 25, 2021

(54) PULL-OUT HOSE GUIDING DEVICE WITH GUIDE WEIGHT ROLLER AND SANITARY SHOWER DEVICE

(71) Applicant: Hansgrohe SE, Schiltach (DE)

(72) Inventors: Fabian Melle, Ortenberg (DE); Jürgen Schorer, Schiltach (DE)

(73) Assignee: Hansgrohe SE, Schiltach (DE)

( * ) Notice: Subject to any disclaimer, the term of this patent is extended or adjusted under 35 U.S.C. 154(b) by 87 days.

(21) Appl. No.: 16/255,808

(22) Filed: Jan. 23, 2019

(65) Prior Publication Data

US 2019/0224708 A1 Jul. 25, 2019

(30) Foreign Application Priority Data

Jan. 24, 2018 (DE) ...................... 10 2018 201 078.1

(51) Int. Cl.
*B05B 15/656* (2018.01)
*B05B 1/14* (2006.01)
(Continued)

(52) U.S. Cl.
CPC .............. *B05B 15/656* (2018.02); *B05B 1/14* (2013.01); *B65H 75/4476* (2013.01); *E03C 1/06* (2013.01);
(Continued)

(58) Field of Classification Search
CPC ........... B65H 75/4476; Y10T 137/6951; Y10T 137/6936; E03C 1/066; B05B 15/656
See application file for complete search history.

(56) References Cited

U.S. PATENT DOCUMENTS 1,318,217 A 10/1919 Manthey
1,740,748 A * 12/1929 Read ...................... B65H 75/38
                                                      137/355.17
(Continued)

FOREIGN PATENT DOCUMENTS

AT          193320          11/1957
CN          1675435 A       9/2005
(Continued)

OTHER PUBLICATIONS

Search Report and Decision to Grant in Russian language with English translation issued by the Federal Service for Intellectual Property, Patents and Trademarks (ROSPATENT), dated Sep. 26, 2019, for Russian Patent Application No. 2019101436/10(002343).
(Continued)

*Primary Examiner* — Kevin F Murphy
(74) *Attorney, Agent, or Firm* — Bose McKinney & Evans LLP

(57) ABSTRACT

A pull-out hose guiding device for guiding a pull-out hose having at least one hose bend of variable hose bend length, wherein the pull-out hose guiding device includes a hose guiding box configured for accommodating the hose bend in an anti-twist manner in a box-inwards hanging position, and a guide weight roller arrangement including at least one guide weight roller which is insertable into a bend reversion zone of the hose bend for rotary motion about a roller rotational axis. The guide weight roller with its roller rotational axis is capable of translational motion in a hose bend lengthwise direction box-outwards with decreasing hose bend length and box-inwards with increasing hose bend length. A sanitary shower device may be equipped with such a pull-out hose guiding device.

12 Claims, 6 Drawing Sheets

(51) Int. Cl.
  *E03C 1/06* (2006.01)
  *B65H 75/44* (2006.01)
  *E03C 1/04* (2006.01)

(52) U.S. Cl.
  CPC . *E03C 2001/0415* (2013.01); *Y10T 137/6951* (2015.04)

(56) References Cited

U.S. PATENT DOCUMENTS

| | | | |
|---|---|---|---|
| 2,026,327 A * | 12/1935 | Sparling | B60S 5/04 137/355.21 |
| 2,118,294 A | 5/1938 | Cox | |
| 5,775,354 A | 7/1998 | Upton | |
| 2004/0010848 A1 | 1/2004 | Esche | |
| 2007/0295866 A1 * | 12/2007 | Yang | E03C 1/06 248/70 |
| 2014/0015243 A1 | 1/2014 | King et al. | |
| 2014/0224914 A1 * | 8/2014 | Sugiura | B65H 75/4471 242/379 |
| 2016/0177551 A1 | 6/2016 | Li et al. | |
| 2016/0229664 A1 | 8/2016 | Savchenko | |
| 2016/0237661 A1 | 8/2016 | Teagarden | |
| 2017/0129355 A1 | 5/2017 | Fournier et al. | |

FOREIGN PATENT DOCUMENTS

| | | |
|---|---|---|
| CN | 1981095 A | 6/2007 |
| CN | 103542217 A | 1/2014 |
| CN | 204647416 U | 9/2015 |
| CN | 107407436 A | 11/2017 |
| DE | 202005019492 U1 | 2/2006 |
| DE | 102015226412 A1 | 6/2017 |
| DE | 102017200327 B3 | 5/2018 |
| RU | 78895 U1 | 12/2008 |
| WO | 2005110913 A2 | 11/2005 |
| WO | 2016008045 A1 | 1/2016 |

OTHER PUBLICATIONS

European Search Report issued by the European Patent Office, Munich, Germany, dated Jun. 24, 2019 for European Patent Application No. EP 19 15 2060.0.

Office Action issued by the German Patent and Trademark Office, dated Jan. 23, 2019, for German Patent Application No. DE 10 2018 201 078.1.

Office Action issued by the Chinese Patent Office, dated Dec. 15, 2020, for Chinese Patent Application No. 201910068227.2.

* cited by examiner

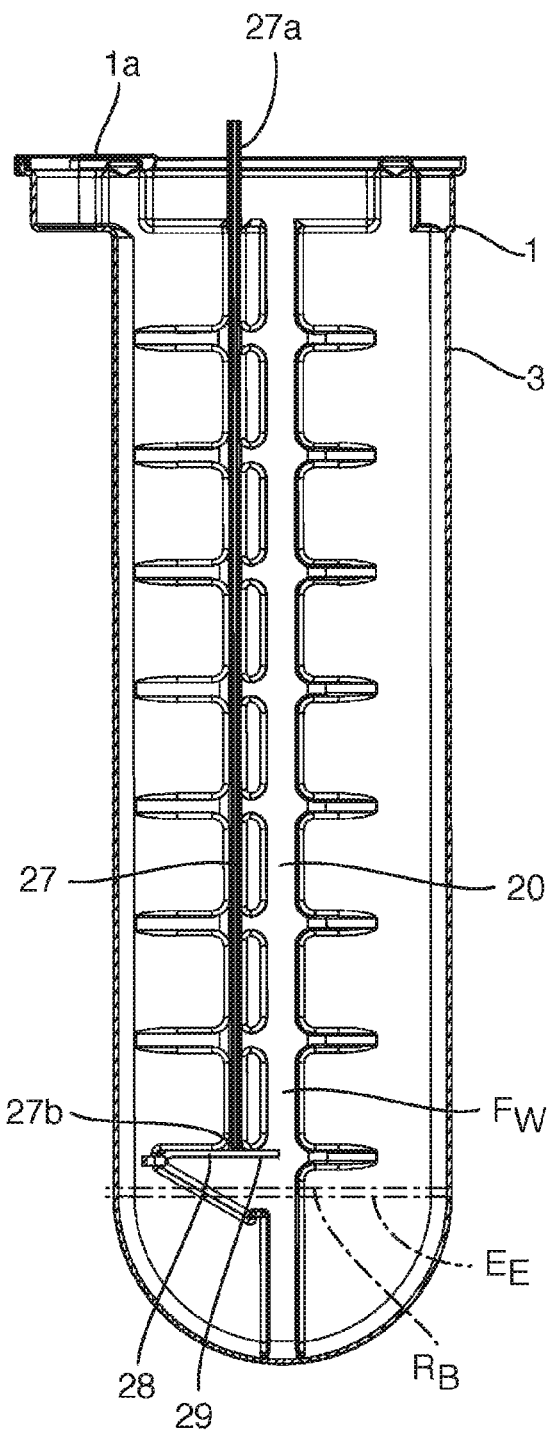
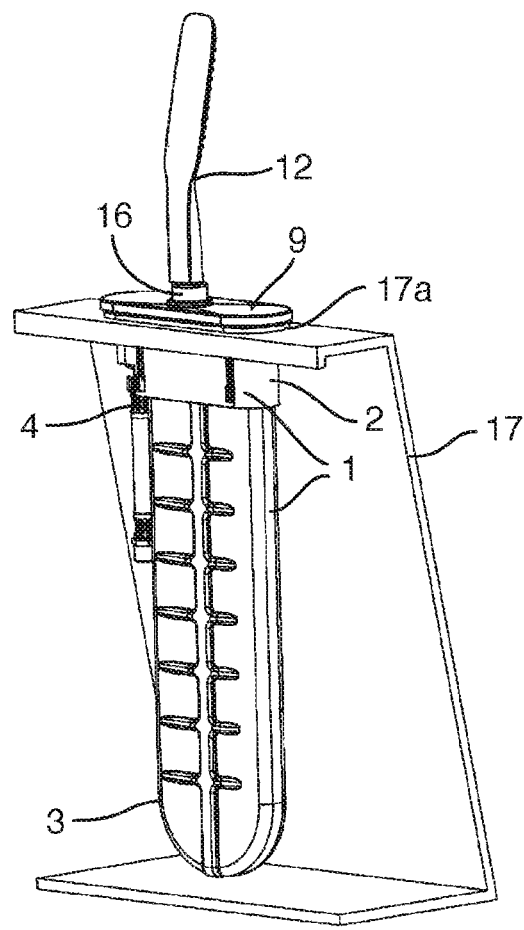
Fig. 11
Fig. 12

PULL-OUT HOSE GUIDING DEVICE WITH GUIDE WEIGHT ROLLER AND SANITARY SHOWER DEVICE

CROSS-REFERENCE TO RELATED APPLICATION

This application claims priority to German Patent Application No. DE 10 2018 201 078.1, filed on Jan. 24, 2018, the disclosure of which is expressly incorporated herein by reference.

BACKGROUND AND SUMMARY OF THE DISCLOSURE

The invention relates to a pull-out hose guiding device for guiding a pull-out hose having at least one hose bend of variable hose bend length, wherein the pull-out hose guiding device comprises a hose guiding box which is configured for accommodating, in an anti-twist manner in a position hanging inwards with respect to the box, the hose bend, and comprises a guide weight roller arrangement having at least one guide weight roller which is configured to be inserted into a bend reversal region of the hose bend in a manner rotatable about a roller rotational axis. The guide weight roller is, with its roller rotational axis, movable in a translatory manner, outwards with respect to the box with decreasing hose bend length and inwards with respect to the box with increasing hose bend length, in a hose bend longitudinal direction. The invention also relates to a sanitary shower device equipped with such a pull-out hose guiding device. The pull-out hose guiding device is able to be used for example for guiding a pull-out hose of a hand-held shower device, able to be pulled out, at a bathtub or in a shower room, or for guiding a pull-out hose of a kitchen pull-out shower device.

The pull-out hose guiding device thus serves for guiding a pull-out hose which comprises one or more hose bends which are accommodated in the hose guiding box in an anti-twist manner in a position hanging inwards with respect to the box, that is to say the hose bends are prevented from twisting in the hose guiding box. A contribution to the anti-twist guidance of the pull-out hose can be made in particular by a corresponding dimensioning of the hose guiding box, which dimensioning ensures that the free movability of the hose bends is suitably limited, for example in that the hose guiding box is constructed to be so narrow that the hose bends cannot twist therein. The pull-out hose can be pulled out of the hose guiding box at a free hose end, wherein the hose bend(s) correspondingly shortens/shorten, and subsequently moved back, or pulled, into the hose guiding box, wherein the hose bend(s) correspondingly lengthens/lengthen again. The respective guide weight roller is able to be inserted into the bend reversal region of the associated hose bend, wherein, during pulling-out or pulling-in of the pull-out hose, the roller rotates about its roller rotational axis and moves together with the latter in a translatory manner, for example upwards or downwards.

In this manner, the guide weight roller forms a loose roller which can guide the hose bend in the bend reversal region and, by way of its weight, can stabilize the hose bend overall, wherein the roller moves, with its roller rotational axis, in an outward direction with respect to the box during the pulling-out of the pull-out hose owing to the decreasing hose bend length and in an inward direction with respect to the box during the inward return movement of the pull-out hose into the hose guiding box owing to the increasing hose bend length. The terms "outward direction with respect to the box" and "inward direction with respect to the box" are consequently to be understood in the present case as meaning the directions along which the hose bend length decreases during the pulling-out of the pull-out hose and increases during the return movement of the pull-out hose into the hose guiding box, respectively. This often corresponds at the same time to the direction in which the pull-out hose is pulled out of the hose guiding box and moved back into the box again, respectively. In a typical position of use of the hose guiding box, the outward direction with respect to the box corresponds to a direction pointing vertically upwards, and the inward direction with respect to the box corresponds to a direction pointing vertically downwards, wherein, in the present case, "vertical direction" does not exclusively mean an exactly vertical direction, but also means a direction whose main direction component is parallel to the vertical, that is to say a direction which points with a larger component in the direction of the vertical than in the direction of the horizontal. It is optionally possible to provide a roller axis guide which guides the guide weight roller with its roller rotational axis in the translatory movement thereof at the hose guiding box.

Various proposals for pull-out hose guiding devices have previously been made. In this regard, laid-open publication DE 10 2015 226 412 A1 discloses a pull-out hose guiding device, in which the hose guiding box is open on the top side and provided there with a securing device which comprises a roller stop element which secures the guide weight roller against exceedance of a predefined upper or, with respect to the box, outward end position and thus against inadvertent passing-out from the hose guiding box.

Patent publication U.S. Pat. No. 2,118,294 discloses a pull-out hose guiding device for guiding two pull-out hoses, having in each case one downwardly hanging hose bend, in a common hose guiding box.

Utility model publication DE 20 2005 019 492 U1 discloses pull-out hose guiding devices for guiding a single, downwardly hanging hose bend and also, in an alternative embodiment, for guiding a plurality of horizontal hose bends of a pull-out hose in a horizontal pulley system arrangement.

Patent publications AT 193 320 and U.S. Pat. No. 1,318,217 disclose pull-out hose guiding devices having a vertical pulley system configuration for guiding a plurality of downwardly hanging hose bends of a pull-out hose. In this configuration, the loose bottom rollers are inserted into the bend reversal regions of the hose bends and arranged transversely offset next to one another on a common rotary bearing unit in a manner rotatable independently of one another about a common roller rotational axis.

In prior German patent application 10 2017 200 327.8, a pull-out hose guiding device of the type mentioned at the outset is disclosed, which is configured for guiding a pull-out hose having a plurality of hose bends and correspondingly has at least two guide weight rollers. The guide weight rollers are arranged offset with offset direction component parallel to at least one of their rotary axes. The hose guiding box has, in its upper box region, at least one hose deflection element, in the form of a sliding bend element arranged immovably on the hose guiding box, for the purpose of hose deflection in each case between two of the downwardly hanging hose bends. The hose guiding box may have a vertical guide for the guide weight rollers.

It is an object of the invention to provide a pull-out hose guiding device of the type mentioned at the outset, which has advantageous properties compared with the aforementioned prior art, in particular with regard to the translatory movement characteristics of one or more guide weight rollers, and a sanitary shower device equipped therewith.

The invention achieves this and other objects through the provision of an inventive pull-out hose guiding device and a sanitary shower device equipped with such inventive pull-out hose guiding device.

The pull-out hose guiding device according to an illustrative embodiment of the invention includes a hose guiding box which is configured for accommodating, in an anti-twist manner in a position hanging inwards with respect to the box, the hose bend, and comprises a guide weight roller arrangement having at least one guide weight roller which is configured to be inserted into a bend reversal region of the hose bend in a manner rotatable about a roller rotational axis. The illustrative pull-out hose guiding device further comprises a roller blocking device which, in a roller release state, releases the guide weight roller with regard to the translatory movement thereof, and, in a roller blocking state, blocks the guide weight roller against further movement at least beyond a roller blocking position in an outward direction with respect to the box, wherein the roller blocking position is spaced apart inwards with respect to the box from an end position outwards with respect to the box of the guide weight roller, which end position corresponds to a minimum hose bend length.

In other words, with the pull-out hose guiding device according to an illustrative embodiment of the invention, it is possible by way of the roller blocking device for the at least one guide weight roller to be held firmly in the roller blocking position before the end position outwards with respect to the box is reached, wherein the end position outwards with respect to the box refers to that position which the guide weight roller assumes in the case of released translatory movement when the pull-out hose has been pulled out of the hose guiding box to the maximum extent and thus the length of the hose bend in the hose guiding box is minimal.

This capability of the illustrative pull-out hose guiding device of being able to block the one or more guide weight rollers by means of the roller blocking device against further movement beyond the roller blocking position in the outward direction with respect to the box as required can be advantageously used, in particular in handling situations in which the hose guiding box is dismounted from its intended place of use for example for maintenance or cleaning purposes.

If, for example, the hose guiding box in an advantageous use is designed so as to be closed, or fluid-tight, in a region at the bottom in the position of use and functions as a collecting container for any leak fluid, it may be necessary for the hose guiding box to be emptied of collected leak fluid from time to time. This can in principle be realized in a simple manner in that the hose guiding box is removed from its place of use and is subsequently tilted for the purpose of emptying the leak fluid, with the result that the leak fluid can exit the hose guiding box in an upper, open region of the hose guiding box, the region then assuming a downwardly tilted position. In this situation, the roller blocking device prevents the respective guide weight roller from being able to move in an unbraked manner out of the bend reversal region of the associated hose bend downwards in the outward direction with respect to the box to the end position outwards with respect to the box, in case the latter is defined in a stop-limiting manner, or even completely out of the hose guiding box. Correspondingly, it is in this way possible to avoid any damage due to the falling guide weight roller and a necessary re-insertion of the guide weight roller into the bend reversal region of the associated hose bend.

Moreover, the blocking of the respective guide weight roller against further movement in the outward direction with respect to the box by the roller blocking device may also be advantageous for other maintenance purposes, for example if maintenance work is required on a side of the hose guiding box lying typically in the outward direction with respect to the box, in the case of the work being expedient to tilt the hose guiding box through 90° or more for this purpose. Then, for such a case too, the situation in which the one or more guide weight rollers move undesirably from the bend reversal region of their associated hose bend as far as the region of this operating side and interfere in the region, or even fall completely out of the box, and subsequently have to be returned into the relevant bend deflection region of the hose bend again is prevented.

In a refinement of the invention, the roller blocking position is an end position inwards with respect to the box of the guide weight roller, which corresponds to a maximum hose bend length with the pull-out hose completely moved back into the hose guiding box, or the roller blocking position is in any case situated closer to the end position inwards with respect to the box than the end position outwards with respect to the box. This measure has the advantage that the respective guide weight roller can be held firmly, or at least blocked against further movement in the outward direction with respect to the box, directly in its end position in-wards with respect to the box or alternatively at a location which is in any case still relatively far in the interior of the hose guiding box, wherein this location is in particular situated closer to the end position inwards with respect to the box than the end position outwards with respect to the box. Consequently, even in a situation in which the pull-out hose is pulled in completely and the guide weight roller is therefore in its end position in-wards with respect to the box, the guide weight roller cannot move or can-not move very far if it is blocked by the roller blocking device against further movement beyond the roller blocking position, even if, for example for the purpose of emptying leak fluid, the hose guiding box is tilted.

In a refinement of the invention, the roller blocking device has a blocking bracket which, on the one hand, is coupled fixedly in terms of translation to the roller rotational axis, that is to say is moved along with the translatory movement of the roller rotational axis, and, on the other hand, comprises a bracket section for engaging behind the hose bend on its lower side in its bend reversal region. This blocking bracket consequently allows the guide weight roller to be held firmly against the hose bend in the bend reversal region thereof such that it cannot move away from the bend reversal region even if, for example, the hose guiding box is tilted. It is self-evident that this provides a useful realization of the roller blocking device in particular for such applications in which the hose bend remains sufficiently positionally/dimensionally stable even in the case of tilting of the hose guiding box, be it due to sufficiently high flexural rigidity of the hose material and/or in that the hose bend is laterally supported against the hose guiding box.

Consequently, the roller blocking device realized in this way is able to hold the guide weight roller firmly in any present position between its end position inwards with respect to the box and its end position outwards with respect to the box in which it is presently situated if the roller blocking device activates the roller blocking position. The latter occurs in this realization of the roller blocking device automatically by way of the tilting of the hose guiding box.

This is because such tilting causes the blocking bracket to come to bear, with its bracket section, from above on the correspondingly tilted bend reversal region of the hose bend owing to the inherent weight of the bracket and the weight of the guide weight roller, which prevents the guide weight roller from moving away downwards from the bend reversal region of the hose bend. By contrast, if the hose guiding box is situated in its position of use, the guide weight roller comes to bear, with its roller periphery, against the bend reversal region of the hose bend without the bracket section of the blocking bracket pressing on the bend reversal region, so that during pulling-out and pulling-in of the hose, the guide weight roller can rotate in the bend reversal region of the hose bend and can, with its roller rotational axis, move in a translatory manner, for example upwardly or downwardly.

In a configuration of the invention, the pull-out hose device includes a plurality of guide weight rollers for a corresponding plurality of hose bends of the pull-out hose, and the blocking bracket is, with its bracket section, configured for engaging behind a plurality of the hose bends on their lower side in their bend reversal region. This may be all or only a portion of all the hose bends. In this case, the blocking bracket can be supported against a plurality of hose bends in order to hold the guide weight rollers in their roller blocking position in the bend reversal regions of the hose bends.

In a further configuration of the invention, for at least two of the guide weight rollers, a common rotary bearing unit is provided, and the blocking bracket comprises a central web section which is coupled by way of an end region to the rotary bearing unit and which extends between two of these at least two guide weight rollers. In this case, the blocking bracket comprises, as a bracket section, bracket sub-sections which project in a manner opposite one another on the other end region of the central web section. The blocking bracket formed in this way allows the guide weight rollers to be held securely and uniformly in their roller blocking position in the bend reversal regions of the hose bends, wherein each of the bracket sub-sections can be supported against one or more bend reversal regions of the hose bends.

In a refinement of the invention, the roller blocking device has a pivotable pivot lever which extends from an actuation end outwards with respect to the box on an operating side of the hose guiding box to a blocking section inwards with respect to the box, and is pivotable between a blocking element release position and a blocking element blocking position. Here, the pivot lever engages, with its blocking section, into a roller rotational axis guiding path of the guide weight roller in a blocking manner in the blocking element blocking position. In this case, the roller rotational axis guiding path refers to a guided travel path along which the roller rotational axis can move in a translatory manner between the end position in-wards with respect to the box and the end position outwards with respect to the box of the guide weight roller. This roller rotational axis guiding path may be formed for example by a roller axis guide which guides the guide weight roller with its roller rotational axis in a translatory manner at the hose guiding box, for example with the aid of a guide groove or some other slot guide path.

Since the pivot lever extends as far as an operating side of the hose guiding box and, there, has an actuating end outward with respect to the box, it can be actuated by the user in a very simple manner in order to pivot it between its release position and its blocking position and, consequently, to activate or to deactivate the roller blocking position for the guide weight roller. In this realization of the roller blocking device, the roller blocking position, in which the guide weight roller can be blocked against further movement in the outward direction with respect to the box, is defined by the position of the blocking section of the pivot lever. In advantageous embodiments, the blocking section, and consequently the roller blocking position, is situated at, or in the vicinity of, the end position inwards with respect to the box of the guide weight roller.

The pivot lever may optionally have, at its actuation end outwards with respect to the box, a releasable dismounting locking element for the hose guiding box, which element secures against inadvertent dismounting of the hose guiding box from its position of use. This is suitable for ex-ample for embodiments in which the hose guiding box has a box housing, for accommodating the pull-out hose, and a box holding frame, to which the box housing is removably attached and which, for its part, can be mounted at a desired position of use, for example on a bathtub paneling or a wall of a shower room or a kitchen sink substructure.

In a refinement of the invention, the roller blocking device has a rotatable threaded control rod and a blocking element movable by the rod between a blocking element release position and a blocking element blocking position, wherein the threaded control rod extends from an actuation end outwards with respect to the box on an operating side of the hose guiding box to a threaded section inwards with respect to the box, and the blocking element cooperates with the threaded section inwards with respect to the box of the threaded control rod. In this realization of the roller blocking device, the threaded control rod can be actuated by rotation on the operating side of the hose guiding box, as a result of which the blocking element can be moved between its release position and its blocking position. In its release position, the blocking element releases the guide weight roller with regard to the translatory movement thereof, while in its blocking position, it activates the roller blocking position for the guide weight roller.

In an embodiment of the invention, the blocking element has a blocking bolt which engages into a roller rotational axis guiding path of the guide weight roller in a blocking manner in the blocking element blocking position. Here too, the roller rotational axis guiding path may be formed for example by a roller axis guide which guides the guide weight roller with its roller rotational axis in a translatory manner at the hose guiding box. For this purpose, the cooperation of the blocking bolt and the threaded control rod may be realized for example such that, when the threaded control rod is rotated, the blocking bolt is moved in a translatory manner transversely with respect to the longitudinal axis of the threaded control rod or with respect to the direction of translatory movement of the guide weight roller.

In an alternative embodiment of the invention, the blocking element has a blocking log which comes to bear against a roller surface of the guide weight roller in a blocking manner in the blocking element blocking position. In this realization, the activation of the roller blocking position for the guide weight roller consequently comprises firm holding of the guide weight roller by way of the blocking bearing of the blocking log against the roller surface. In this way, the cooperation of the blocking log and the threaded control rod may be realized for example such that, when the threaded control rod is rotated, the blocking log is moved transversely with respect to the threaded control rod. It is optionally possible for the blocking log to be constructed from two log plates, which cooperate via an inclined surface coupling and of which the one is coupled to the threaded control rod and, when the threaded control rod is rotated, slides along the inclined surface coupling, as a result of which the other log plate is pressed against the roller surface of the guide weight roller.

In both alternative configurations of the blocking element, as a blocking bolt or as a blocking log, the guide weight roller may be blocked, or blocked against further movement in the outward direction with respect to the box, at the position at which the blocking bolt or the blocking log is situated. Preferably, this again corresponds to the end position inwards with respect to the box of the guide weight roller or to a position of the guide weight roller which is not far away therefrom.

In a refinement of the invention, the roller blocking device has an axially movable control rod and a blocking element movable by the rod between a blocking element release position and a blocking element blocking position, wherein the control rod extends from an actuation end outwards with respect to the box on an operating side of the hose guiding box to a control section inwards with respect to the box, and the blocking element cooperates with the control section inwards with respect to the box of the control rod, and engages into a roller rotational axis guiding path of the guide weight roller in a blocking manner in the blocking element blocking position. The control rod can be actuated, that is to say axially moved, by a user at its actuation end outwards with respect to the box on the operating side of the hose guiding box, as a result of which the user can activate or deactivate the roller blocking position for the guide weight roller.

Again, the roller rotational axis guiding path may be formed for example by a roller axis guide which guides the guide weight roller with its roller rotational axis in a translatory manner at the hose guiding box. Moreover, it is also possible here for the blocking element to be positioned such that the roller blocking position for the guide weight roller corresponds to the end position inwards with respect to the box thereof or is not far away therefrom. In an advantageous configuration, the blocking element may be resiliently movable and arranged such that it is held preloaded at the hose guiding box in the blocking element blocking position and can be moved into the blocking element release position by way of the axial movement of the control rod counter to the elastic preload force.

The sanitary shower device according to an illustrative embodiment of the invention comprises a shower head unit and a pull-out hose to which the shower head unit is coupled, and also a pull-out hose guiding device for guiding the pull-out hose. The sanitary shower device may be realized, for example, as a hand-held shower head for a bathtub or a shower room or as a kitchen pull-out shower device.

Additional features and advantages of the present invention will become apparent to those skilled in the art upon consideration of the following detailed descriptions of the illustrative embodiment best exemplifying the best mode of carrying out the invention as presently perceived.

BRIEF DESCRIPTION OF THE DRAWINGS

Advantageous embodiments of the invention are illustrated in the drawings. These and further advantageous embodiments of the invention will be described in more detail below. In the figures:

FIG. 11 shows a longitudinal sectional view of a pull-out hose guiding device similar to FIGS. 9 and 10, with a roller blocking device with axially movable control rod;

FIG. 12 shows, from the inside, a perspective view of a tub paneling region, with a shower device as per FIG. 1 mounted thereon.

DETAILED DESCRIPTION OF THE DRAWINGS

Figure 1:
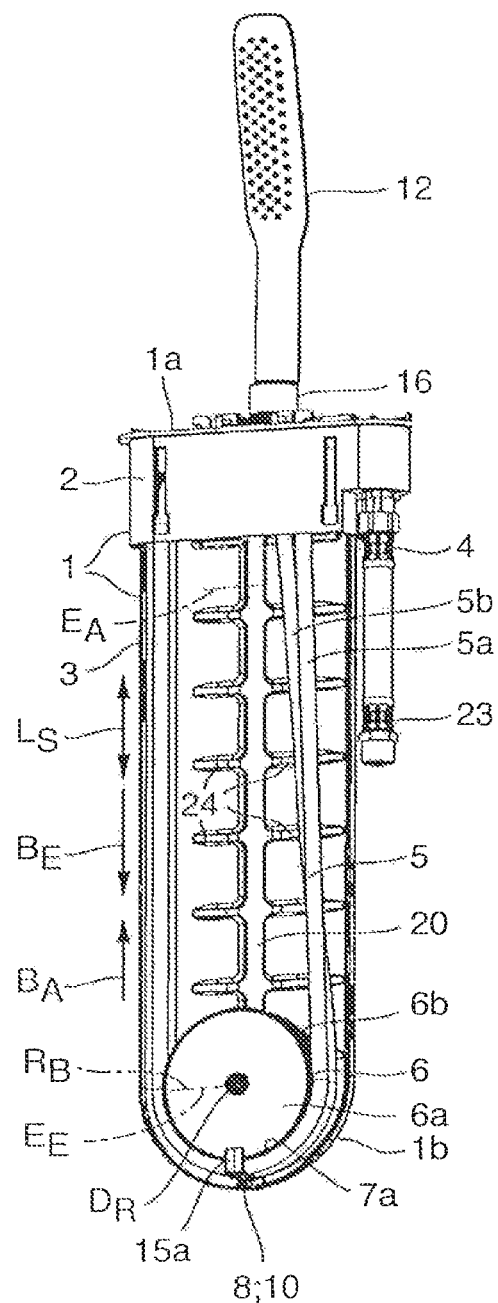
FIG. 1 shows a perspective longitudinal sectional view of a shower device with shower head unit, pull-out hose and pull-out hose guiding device with roller blocking device.
Figure 2:
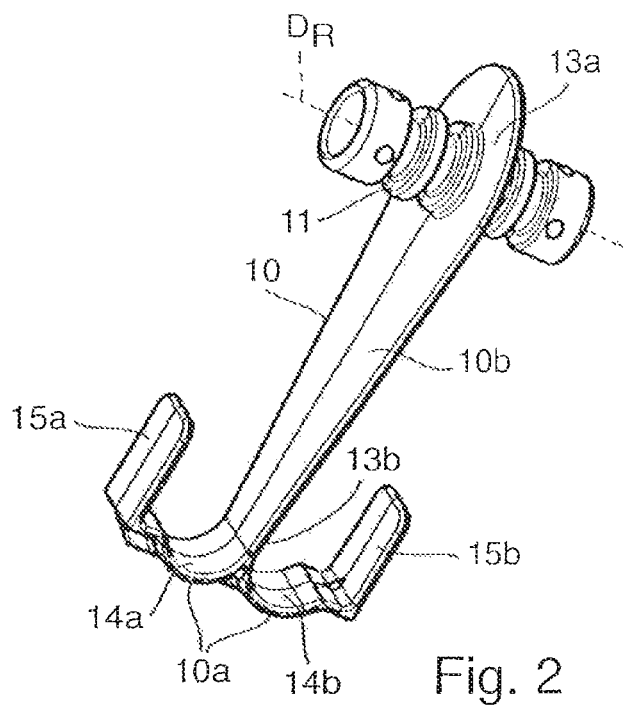
FIG. 2 shows a perspective view of a blocking bracket-rotary bearing structural unit of the pull-out hose guiding device in FIG. 1.
Figure 3:
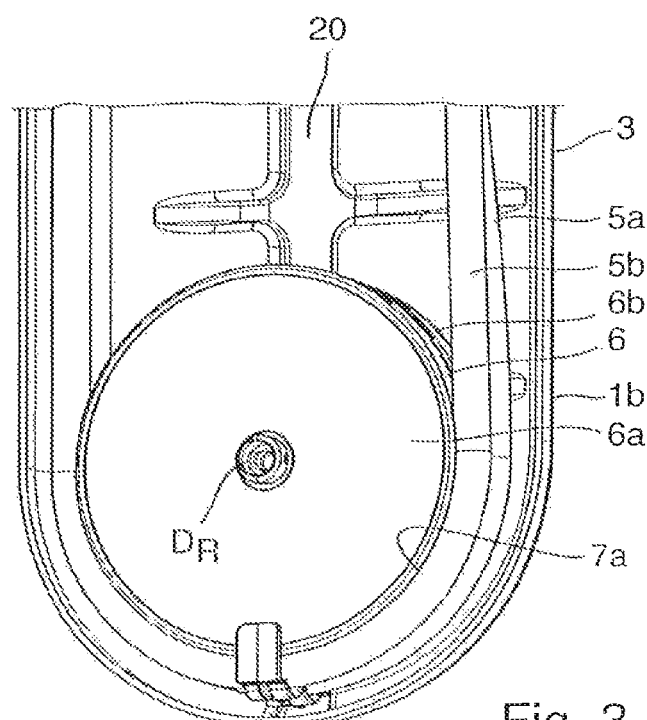
FIG. 3 shows a detail view of a lower region in FIG. 1.

The embodiments of the invention described herein are not intended to be exhaustive or to limit the invention to precise forms disclosed. Rather, the embodiments selected for description have been chosen to enable one skilled in the art to practice the invention.

The shower device illustrated in the figures comprises a pull-out hose device, which comprises a pull-out hose 5 having at least one hose bend 5a of variable hose bend length and a pull-out hose guiding device for guiding the pull-out hose 5. In the exemplary embodiment shown, the pull-out hose 5 comprises two hose bends 5a, 5b, and in alternative embodiments, it comprises only one or three or more hose bends. The pull-out hose guiding device comprises a hose guiding box 1, which is configured for accommodating, in an anti-twist manner in a position hanging inwards with respect to the box, the respective hose bend 5a, 5b. In the view in FIG. 1, a corresponding inward direction $B_E$ with respect to the box points downwards.

In corresponding embodiments, the hose guiding box 1 comprises, as shown, a box holding frame 2 and a box housing 3 which can be releasably attached to the box holding frame 2, for example by insertion from above into the box holding frame 2. According to requirement, the box housing 3 may then be taken out of the box holding frame 2 again in an upward direction. In alternative embodiments, the hose guiding box is constructed in some other manner, for example with a one-part housing construction without a separate box holding frame.

The pull-out hose guiding device furthermore comprises a guide weight roller arrangement 6 having at least one guide weight roller 6a which is able to be inserted into a bend reversal region 7a of the hose bend 5a in a manner rotatable about a roller rotational axis $D_R$. Here, the guide weight roller 6a is, with its roller rotational axis $D_R$, movable in a translatory manner, outwards with respect to the box with decreasing hose bend length and inwards with respect to the box with increasing hose bend length, in a hose bend longitudinal direction $L_S$, wherein a corresponding outward direction $B_A$ with respect to the box is opposite to the inward direction $B_E$ with respect to the box and points to outside the hose guiding box 1, upwards in FIG. 1.

Generally, the guide weight roller arrangement 6 comprises in each case one guide weight roller for each hose bend, and consequently, in the example shown, two guide weight rollers 6a, 6b for the two hose bends 5a, 5b. The guide weight roller arrangement 6 may in particular be one such as described in the aforementioned prior German patent application 10 2017 200 327, to which reference may additionally be made in the present case for further related details. The guide weight roller arrangement 6, together with the dimensioning, matched to the size of the hose bend(s) 5a, 5b, of the hose guiding box 1, assists with anti-twist accommodation of the hose bends 5a, 5b and, owing to the inherent weight of the guide weight rollers 6a, 6b, can additionally assist with returning of the pulled-out pull-out hose 5 into the hose guiding box 1.

Figure 4:
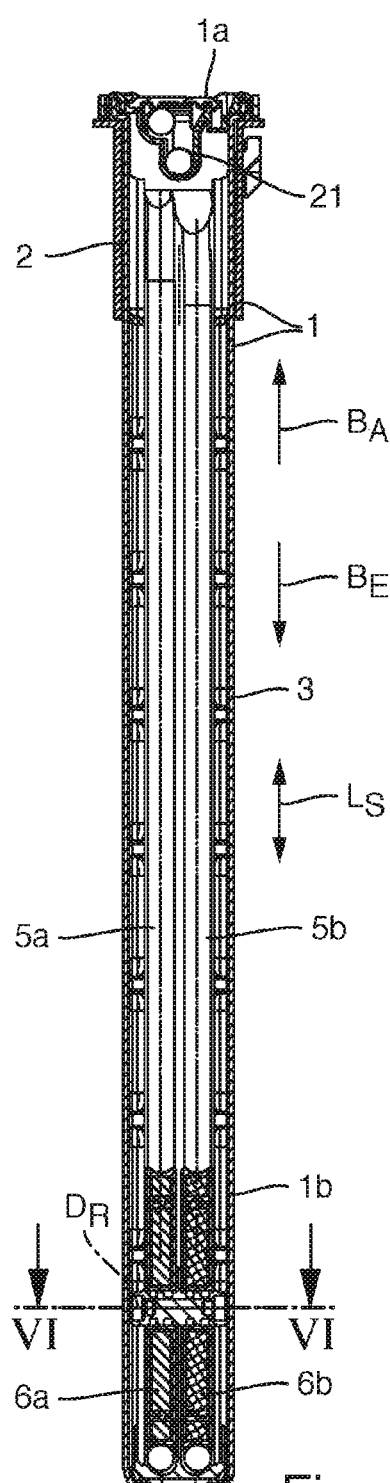
FIG. 4 shows a longitudinal sectional view of the pull-out hose guiding device with pull-out hose in FIG. 1.
Figure 5:
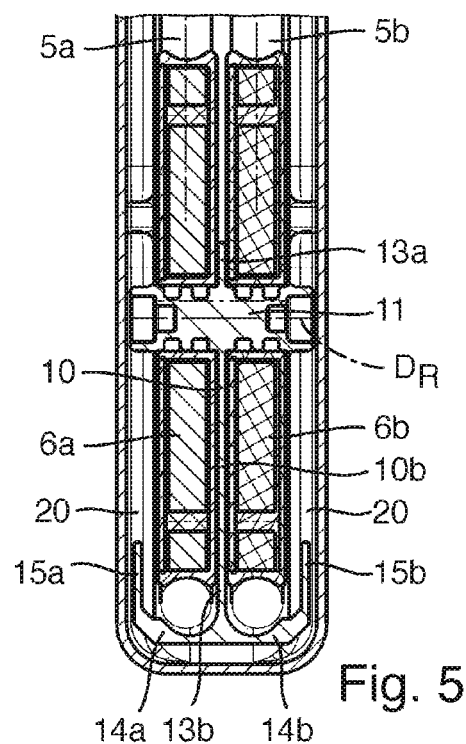
FIG. 5 shows a detail view of a lower region in FIG. 4.
Figure 6:
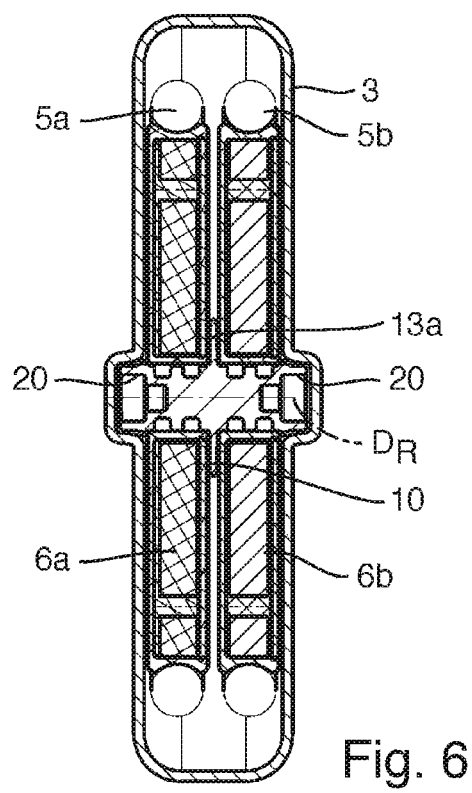
FIG. 6 shows a sectional view along a line VI-VI in FIG. 4.

The guide weight rollers 6a, 6b function as loose rollers which, in corresponding embodiments of the pull-out hose device, are, in the installation position, vertically movable in a translatory manner, for which purpose their rotational axis $D_R$ is guided in a vertical guide 20 on the inner side of the box housing 3 in a correspondingly vertically movable manner. In the example shown, the two guide weight rollers 6a, 6b have a common rotational axis $D_R$, and in alternative embodiments, they are arranged with non-coinciding rotational axes. A sliding bend element 21 which is arranged immovably on the hose guiding box 1, as can be seen for example in FIGS. 4 and 7, serves for the upper hose deflection between the two hose bends 5a, 5b shown.

Furthermore, the pull-out hose guiding device has a roller blocking device 8 which, in a roller release state, releases the respective guide weight roller 6a, 6b with regard to the translatory movement thereof, and in a roller blocking state, blocks the guide weight roller 6a, 6b against further movement at least beyond a roller blocking position $R_B$ in outward direction $B_A$ with respect to the box. Here, the roller blocking position $R_B$ is spaced apart inwards with respect to the box from an end position $E_A$ outwards with respect to the box of the guide weight roller 6a, 6b. The end position $E_A$ outwards with respect to the box is in this case that position which the guide weight roller 6a, 6b assumes when, as a result of the pull-out hose 5 being pulled out to the maximum extent, the associated hose bend 5a, 5b has its minimum length, that is to say an upper end position in FIG. 1. FIG. 1 shows the pull-out hose device with the pull-out hose 5 completely retracted into the hose guiding box 1, with the result that the hose bends 5a, 5b have their maximum hose bend length and the guide weight rollers 6a, 6b are situated at an end position $E_E$ inwards with respect to the box, that is to say in a lower end position in FIG. 1.

The shower device, which may for example be a sanitary shower device, further comprises a shower head unit 12, which is coupled to that end of the pull-out hose 5 which is able to be pulled out. In the example shown, the hose guiding box 1 comprises an optional holder 16 for the removable holding of the shower head unit 12. At its other end, the pull-out hose 5 opens into a fluid connection 4 which can be connected with a connection piece 23 to a water supply or some other fluid supply. Here, the fluid connection 4 can be held entirely or partly on the hose guiding box 1, specifically entirely or partly on the box housing 3 and/or on the box holding frame 2. In alternative applications, that end of the pull-out hose 5 which is able to be pulled out may serve as a fluid inlet, and the connecting piece 23 of the fluid connection 4 may serve as a fluid outlet, of the pull-out hose device.

In corresponding embodiments of the pull-out hose device, the hose guiding box 1 is, as in the example shown, designed so as to be open on a top side 1a and fluid-tight at least in a lower region 1b. In this way, it is possible for fluid, which passes into the hose guiding box 1 owing to a leak or as spray water or for some other reason, to be collected in the box housing 3 with its fluid-tight lower region 1b. The open top side 1a may be used to arrange there that end of the pull-out hose 5 which is able to be pulled out, that is to say to be able there to pull the pull-out hose 5 upwards out of the hose guiding box 1. Optionally, it is possible for the open top side 1a of the hose guiding box 1, specifically of the box housing 3, to be covered by a removable cover rose 9, as in the example shown. In alternative embodiments, the pull-out hose 5 is able to be pulled out on another side of the hose guiding box 1 from the latter, for example at the bottom or at a side. Optionally, the box housing 3 may, as shown, be pro-vided with a reinforcement rib structure 24. This can promote the stability of the box housing 3 and promote production of the housing 3 with a relatively low weight.

In corresponding embodiments of the pull-out hose device, the respective hose bend 5a, 5b is, as in the example shown, accommodated in the hose guiding box 1 with variable length so as to hang downwards in a U-shaped manner, and the hose guiding box 1 may run in a U-shaped manner on its bottom side and/or have a larger vertical length compared with its horizontal width. This permits a correspondingly large length for the hose bends 5a, 5b in the hose guiding box 1, can limit lateral moving-away of the hose bends 5a, 5b, and makes possible a compact design of the hose guiding box 1. In corresponding embodiments of the pull-out hose device, the hose guiding box 1 has, as in the example shown, a smaller horizontal depth compared with its horizontal width. This promotes anti-twist accommodation of the hose bends 5a, 5b.

Figure 13:
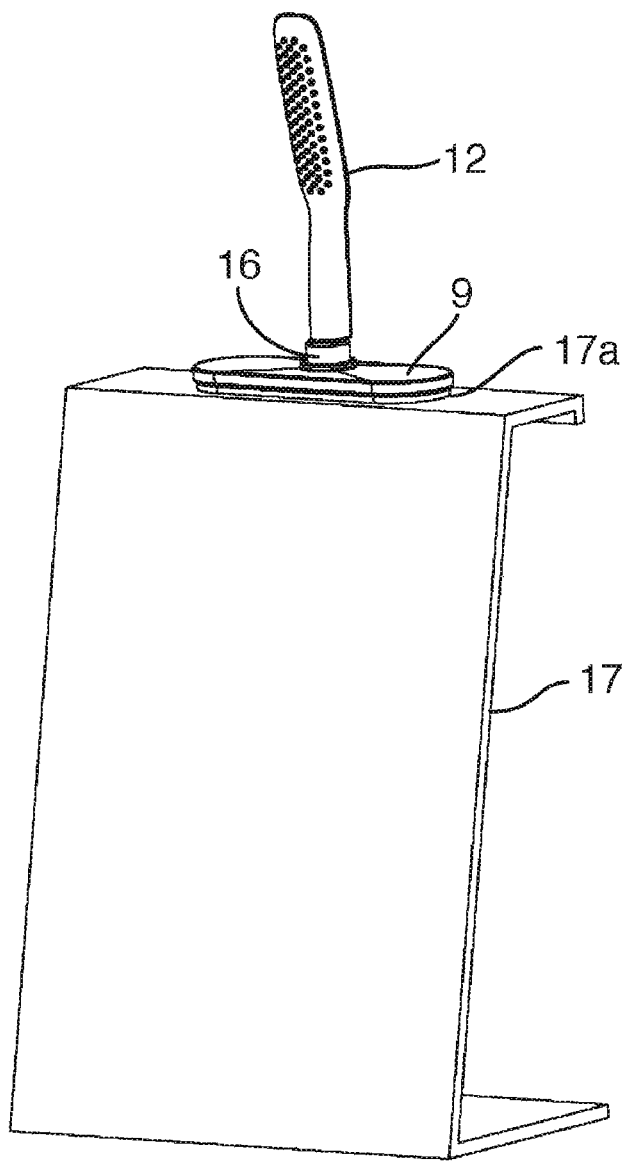
FIG. 13 shows, from the outside, a perspective view of the tub paneling region in FIG. 12, with the shower device mounted thereon.

In the exemplary embodiment shown, the shower device is suitable for example as a bathtub hand-held shower device, in the case of which the pull-out hose device may be arranged for example so as to be concealed on the inner side of an associated tub paneling 17, as illustrated in FIGS. 12 and 13. In the example shown, the pull-out hose device is, for this purpose, held on the tub paneling 17 by way of the box holding frame 2 in a corresponding opening of a top side region 17a of the tub paneling 17. This top side region of the tub paneling 17 may for example connect laterally to a tub edge of the bathtub. For use as a hand-held shower device in the bathtub, the shower head unit 12 can be pulled upwards out of the hose guiding box 1. Following use, it can be returned into its holder 16 on the hose guiding box 1 again. The return movement can be assisted by the guide weight roller arrangement 6, in particular by the weight of the guide weight rollers 6a, 6b.

In corresponding embodiments of the pull-out hose guiding device, the roller blocking position $R_B$ is identical to the end position $E_E$ inwards with respect to the box of the guide weight roller 6a, 6b, as illustrated in FIG. 1. In alternative embodiments, the roller blocking position $R_B$ is situated between the two end positions $E_A$, $E_E$ of the guide weight roller 6a, 6b and, in this case, preferably closer to the end position $E_E$ inwards with respect to the box than the end position $E_B$ outwards with respect to the box.

The roller blocking device 8 especially has the advantage that the guide weight rollers 6a, 6b cannot fall arbitrarily far from their hose bends 6a, 6b if the hose guiding box 1 is tilted such that then its lower region 1b is at the top and its open top side 1a is at the bottom, for example while the hose guiding box 1 is being mounted or dismounted or for the purpose of emptying collected leak fluid. Without the roller blocking device, the guide weight rollers 6a, 6b could in this case fall downwards from the respective bend reversal region 7a, 7b of the hose bends 5a, 5b to their end position $E_A$ outwards with respect to the box, in case the latter is defined in a stop-limited manner, or even fall completely out of the hose guiding box 1, if this is not prevented by another measure. The roller blocking device 8 ensures that the guide weight rollers 6a, 6b cannot move away beyond the roller blocking position $R_B$ in the outward direction $B_A$ with respect to the box in such a case.

In a corresponding embodiment, as is shown in FIGS. 1 to 6, the roller blocking device 8 has a blocking bracket 10 which, on the one hand, is coupled fixedly in terms of translation to the roller rotational axis $D_R$ and, on the other hand, has a bracket section 10a for engaging behind the respective hose bend 5a, 5b on its lower side in its bend reversal region 7a, 7b. In corresponding embodiments with a plurality of guide weight rollers 6a, 6b for a corresponding plurality of hose bends 5a, 5b, as in the example shown, the blocking bracket 10 is, with its bracket section 10a, configured for engaging behind a plurality of the hose bends 5a, 5b on their lower side in their respective bend reversal region 7a, 7b. This may be all, or in any case a portion of, the plurality of hose bends 5a, 5b which are present overall.

In corresponding embodiments, for at least two of the guide weight rollers 6a, 6b, a common rotary bearing unit 11 is, as in the exemplary embodiment shown, provided, and the blocking bracket 10 has a central web section 10b which is coupled by way of an end region 13a to the rotary bearing unit 11 and which extends between two of these at least two guide weight rollers 6a, 6b. In this case, the blocking bracket 10 also has two bracket sub-sections 14a, 14b which project in a manner opposite one another on the other end region 13b of the central web section 10b.

Optionally, as in the example shown, there is provided on the bracket section 10a or on the bracket sub-sections 14a, 14b a guide extension 15a, 15b which not only forms, together with the bracket section 10a and the central web section 10b of the blocking bracket 10, a U-shaped guide aid for the associated hose bend 5a, 5b guided through therein, but also can serve as an anti-twist means for the blocking bracket 10. For this purpose, the guide extension 15a, 15b engages into the vertical guide 20, which is formed for example as a vertical groove on the inner wall of the box housing 3 and in which the guide weight rollers 6a, 6b are also guided with regard to the translatory movement thereof, for example in that the rotary bearing unit 11 engages with its ends on both sides into in each case one of the vertical guides 20 formed on opposite side walls of the box housing 3.

The rotary bearing unit 11 functions as a common bearing for the guide weight rollers 6a, 6b and defines their common rotational axis $D_R$. Preferably, the guide weight rollers 6a, 6b are arranged parallel and offset from one another in the direction of the rotational axis $D_R$. In the example shown, the guide weight rollers 6a, 6b are also arranged parallel to side walls of the hose guiding box 1, as can be seen in particular from FIGS. 5 and 6, and in alternative embodiments, they are arranged inclined with respect to the box side walls. In the exemplary embodiment shown, the blocking bracket 10 and the rotary bearing unit 11 are formed by a corresponding combination component, as can be seen from FIG. 2, and alternatively, the holding bracket 10 may be connected fixedly in terms of translation to the rotary bearing unit 11 in some other manner.

In this realization of the blocking bracket, the roller blocking device 8 has the property that it firmly holds the guide weight rollers 6a, 6b, or blocks the latter against further movement in the outward direction $B_A$ with respect to the box, in their respective present position in the bend reversal region 7a, 7b of the associated hose bends 5a, 5b if the roller blocking de-vice 8 reaches its roller blocking state. In this example, this is the case if, proceeding from its vertical position of use, the hose guiding box 1 is tilted by more than 90°, so that, without the roller blocking device 8, the guide weight rollers 6a, 6b could fall downwards from the hose bends 5a, 5b. The blocking bracket 10 prevents this in any vertical position of the guide weight rollers 6a, 6b, that is to say for any present hose bend length of the hose bends 5a, 5b, in that, in this tilted position of the hose guiding box 1, the bracket 10 comes to bear, with its bracket section 10a, on the respective hose bend 5a, 5b in the region of the reversal point thereof. In this way, the hose bends 5a, 5b, with their bend deflection regions 7a, 7b, hold the guide weight rollers 6a, 6b firmly in their vertical position in the bend de-flection regions 7a, 7b. For this purpose, the hose bends 5a, 5b possess the required inherent stiffness and/or are supported laterally against the adjacent narrow side walls of the hose guiding box 1.

Thus, in this realization of the blocking bracket of the roller blocking device 8, the guide weight rollers 6a, 6b are held firmly in the end position $E_E$ inwards with respect to the box if they are present there at the time of the tilting of the hose guiding box 1, that is to say the roller blocking position $R_B$ is then identical to the end position $E_E$ inwards with respect to the box. If the hose guiding box 1 is tilted with a partly or fully pulled-out pull-out hose 5, the guide weight rollers 6a, 6b are blocked against further movement in the outward direction $B_A$ with respect to the box in the correspondingly raised present position of the rollers 6a, 6b, which position then forms the roller blocking position $R_B$.

Figure 7:
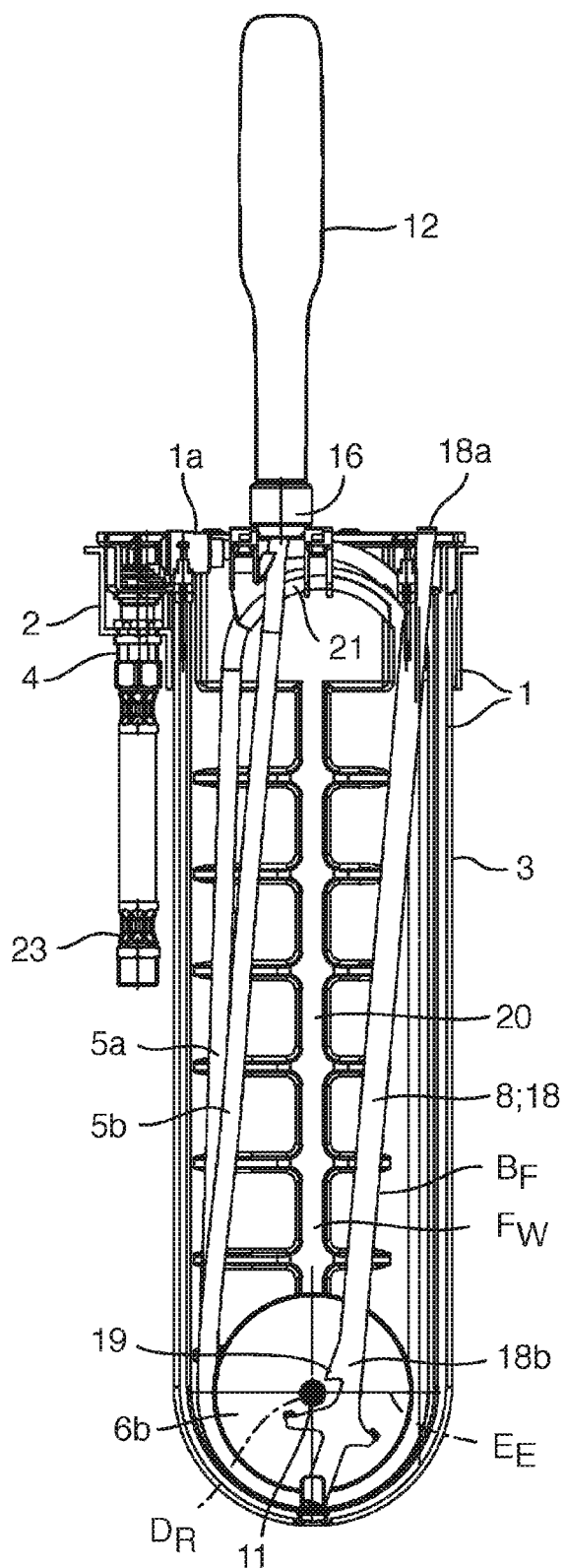
FIG. 7 shows a longitudinal sectional view of a shower device similar to FIG. 1, with a roller blocking device with pivotable pivot lever in a roller release state.
Figure 8:
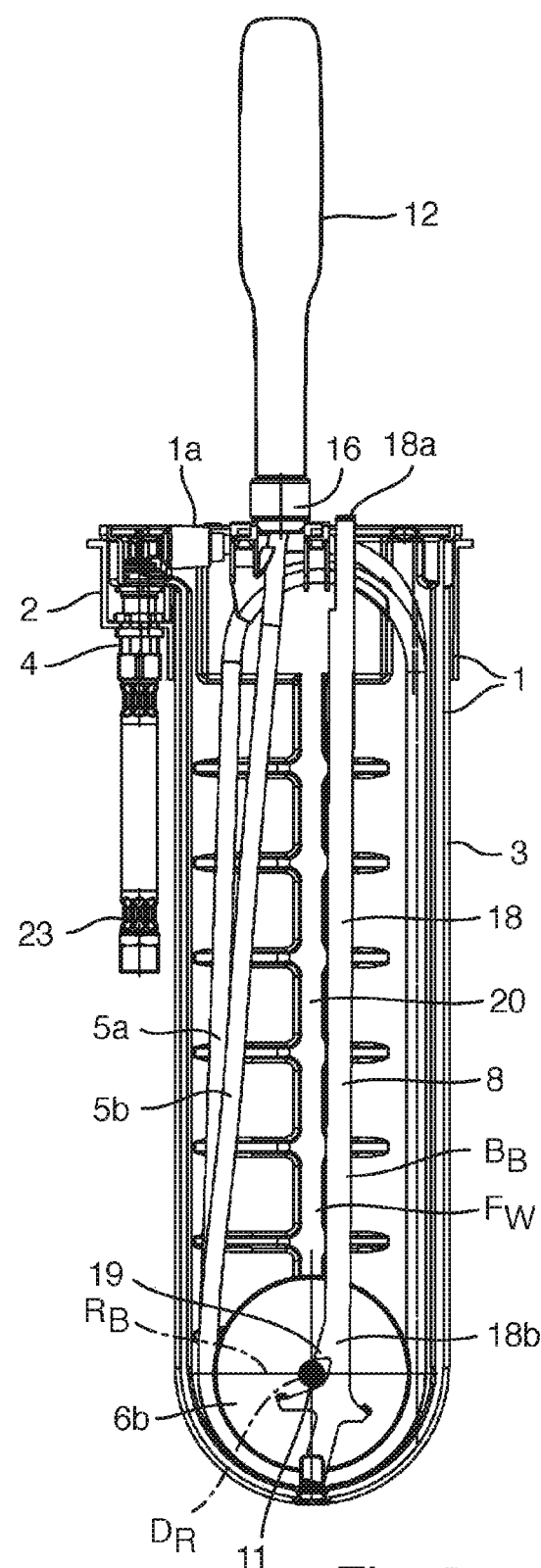
FIG. 8 shows the sectional view in FIG. 7, with the roller blocking device in a roller blocking position.

FIGS. 7 to 11 illustrate alternative embodiments of the roller blocking device 8. In the realization shown in FIGS. 7 and 8, the roller blocking device comprises a pivotable pivot lever 18 which extends from an actuation end 18a outwards with respect to the box on an operating side of the hose guiding box 1 to a blocking section 18b inwards with respect to the box, and is pivotable between a blocking element release position $B_F$, which is shown in FIG. 7, and a blocking element blocking position $B_B$, which is shown in FIG. 8. In the example shown, the open top side 1a of the hose guiding box 1 acts as the operating side, and the pivot lever 18 is able to be pivoted about a pivoting axis situated in the vicinity of the lowermost point of the hose guiding box 1.

With its blocking section 18b, the pivot lever 18 engages into a roller rotational axis guiding path $F_W$ in a blocking manner in the blocking element blocking position $B_B$, which path is given by the vertical guide 20 in the example shown and generally refers to the guided translation path along which the respective guide weight roller 6a, 6b is, with its roller rotational axis $D_R$, moved in a translatory manner if the length of the associated hose bend 5a, 5b is changed by the pulling-out or pulling-in of the pull-out hose 5. In the example shown, the pivot lever 18 has, for this purpose, a blocking lug 19 in its blocking section 18b, which lug, in the blocking position $B_B$ of the pivot lever 18, is situated in the guide path $F_W$ of the roller rotational axis $D_R$ or of the rotary bearing unit 11. In this way, the blocking lug 19 blocks the guide path $F_W$ for the guide weight rollers 6a, 6b, which consequently are not able to move beyond the blocking lug 19 in the outward direction $B_A$ with respect to the box from a position which is inwards with respect to the box in relation to the blocking lug 19. Consequently, in this example, the roller blocking position $R_B$ for the guide weight rollers 6a, 6b is determined by the position of the blocking lug 19. In the blocking element release position $B_F$, the blocking lug 19 is pivoted out of the roller rotational axis guide path $F_W$ such that the guide weight rollers 6a, 6b are able to move freely along the roller rotational axis guide path $F_W$ or the vertical guide 20.

FIGS. 7 and 8 show an embodiment in which the blocking lug 19 is provided at one location of the pivot lever 18, which results in the roller blocking position $R_B$ being identical to the end position $E_E$ inwards with respect to the box or, in any case, being spaced apart by a small clearance therefrom. In alternative embodiments, the blocking lug is provided at a location on the pivot lever 18 which is situated further in the outward direction $B_A$ with respect to the box. In this case, the guide weight rollers 6a, 6b are then able to move to a corresponding extent out of their end position $E_E$ inwards with respect to the box as far as the roller blocking position $R_B$ between the two end positions $E_E$ and $E_A$. In any case, it is in these realizations also prevented that the guide weight rollers 6a, 6b can fall out as far as the end position $E_A$ outwards with respect to the box or completely out of the hose guiding box 1.

At the actuation end 18a outwards with respect to box, a user can actuate the pivot lever 18, that is to say pivot the lever 18 between its blocking position $B_B$ and its release position $B_F$, at the accessible box top side 1a. If as shown the hose guiding box 1 is constructed from the box holding frame 2 and the box housing 3 which is able to be inserted therein, the pivot lever 18 may optionally have a releasable, that is to say unlockable, dismounting locking element for the hose guiding box 1. If the pivot lever 18 is in its blocking element release position $B_F$, the locking element locks the box housing 3 in the box holding frame 2, that is to say the box housing 3 cannot be removed from the box holding frame 2. If the pivot lever 18 is in its blocking element blocking position $B_B$, the dismounting locking element is in an unlocking position in which the dismounting of the box housing 3 from the box holding frame 2 is released by it. In this way, it can be ensured that the roller blocking device 8 is in its roller blocking state if the box housing 3 is removed from the box holding frame 2.

The dismounting locking element may be realized for example by a corresponding locking bracket, which is formed in the region of the actuation end 18a on the pivot lever 18. The locking bracket can act directly on the box holding frame 2 and the box housing 3, or alternatively for example on a holding bracket arrangement having at least one holding bracket which is arranged so as to be able to perform a folding movement at the box top side 1a on the box housing 3. For its part, the holding bracket may have dismounting prevention means such that it blocks the removal of the box housing 3 from the box holding frame 2 if it is in a position folded down parallel to the box top side 1a, and releases the dismounting of the box housing 3 from the box holding frame 2 if it is in a folded-up state in which it can function as a handling means for the removal of the box housing 3 from the box holding frame 2. In this case, the locking bracket of the pivot lever 18 blocks the folding-up of the holding bracket(s) if the pivot lever 18 is in its blocking element release position $B_F$. As soon as the pivot lever 18 is pivoted into its blocking position $B_B$, its locking bracket releases the folding-up of the holding bracket(s).

Figure 9:
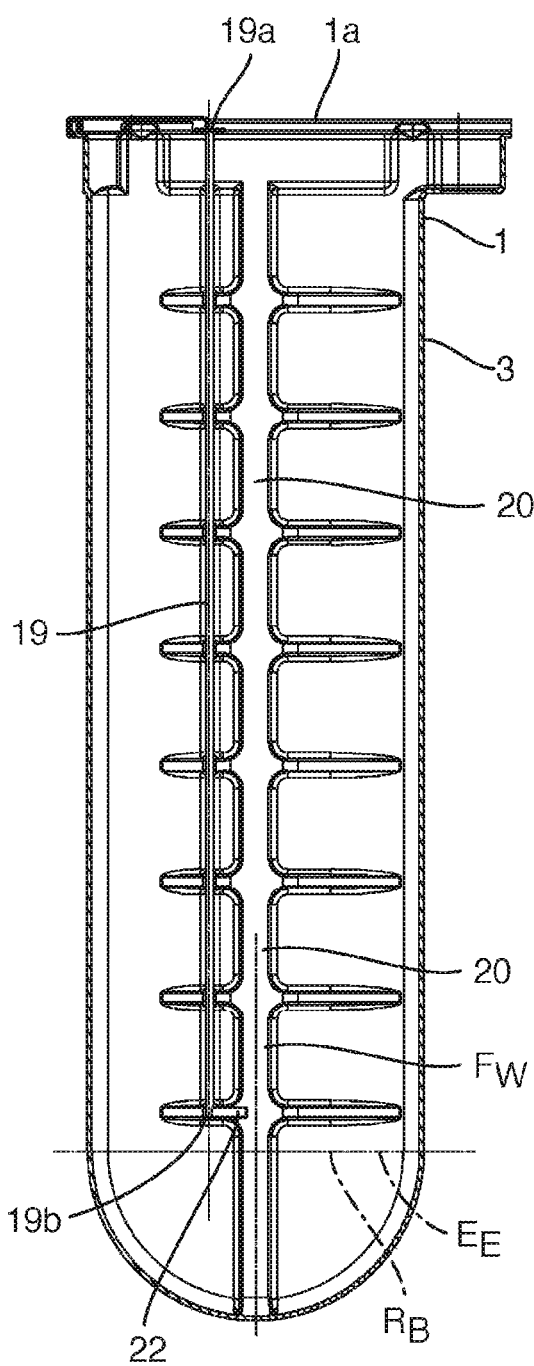
FIG. 9 shows a longitudinal sectional view of a pull-out hose guiding device similar to that in FIGS. 1 to 8, with a roller blocking device with rotatable threaded control rod and blocking bolt.

In the embodiment shown in FIG. 9, the roller blocking device 8 comprises a rotatable threaded control rod 19 and a blocking element which is movable by the rod 19 between a blocking element release position $B_F$ and a blocking element blocking position $B_B$, wherein here too, the blocking element release position $B_F$ is that position in which, in this case by way of the blocking element, the roller blocking device 8 is in the roller release state and the blocking element blocking position $B_B$ is that position in which the roller blocking device 8 is in the roller blocking state. In this example, the blocking element is in the form of a blocking bolt 22 which engages into the roller rotational axis guiding path $F_W$ of the guide weight rollers 6a, 6b in a blocking manner in the blocking element blocking position $B_B$. The threaded control rod 19 extends from an actuation end 19a outwards with respect to the box on an operating side, here again the box top side 1a, to a threaded section 19b inwards with respect to the box, with which the blocking element 22 cooperates.

If the user rotates the threaded control rod 19 at its actuation end 19a, the blocking bolt 22 is moved into the roller axis guiding path $F_W$ or out of the guiding path $F_W$, transversely with respect to the longitudinal direction of the threaded control rod 19. In this way, the blocking element 22 acts in the same manner as the blocking lug 19 of the pivot lever 18 in the embodiment in FIGS. 7 and 8. Moreover, like the blocking lug 19, the blocking element 22 may, as an alternative to its position shown in FIG. 9, in which it holds the guide weight rollers 6a, 6b firmly in the region of their end position $E_E$ inwards with respect to the box, be arranged at some other location along the threaded control rod 19 or along the roller rotational axis guide path $F_W$.

Figure 10:
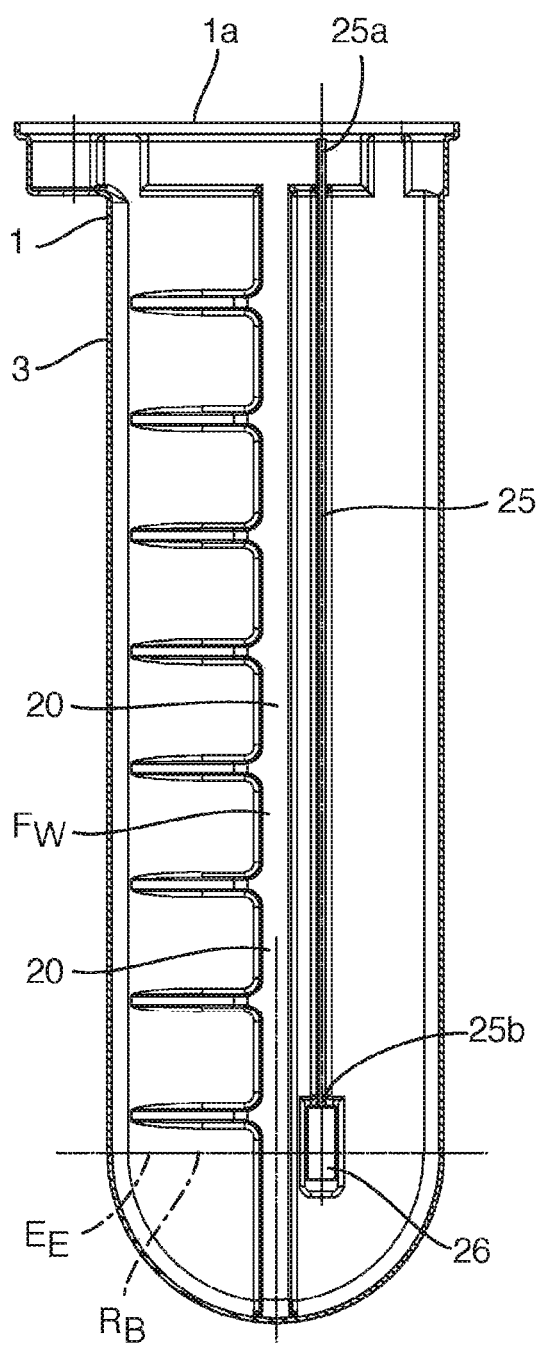
FIG. 10 shows a longitudinal sectional view of a pull-out hose guiding device similar to FIG. 9, with a roller blocking device with threaded control rod and blocking log.

In a realization illustrated in FIG. 10, the roller blocking device 8 comprises, similarly to the example in FIG. 9, a rotatable threaded control rod 25, which extends from an actuation end 25a outwards with respect to the box on an operating side of the hose guiding box 1 to a threaded section 25b inwards with respect to the box, and a blocking element, which cooperates with the threaded section 25b inwards with respect to the box of the threaded control rod 25 and is movable thereby between a blocking element release position $B_F$ and a blocking element blocking position $B_B$. In this exemplary embodiment, the blocking element is formed by a blocking log 26 which comes to bear against a roller surface of the guide weight rollers 6a, 6b in a blocking manner in the blocking element blocking position $B_B$. Thus, in this case, the roller blocking device 8 blocks the guide weight rollers 6a, 6b with respect to moving-away along the roller rotational axis guiding path $F_W$ not in that it blocks the guiding path $F_W$, but in that the blocking log 26 is pressed against the roller surface of the guide weight roller 6a, 6b and, in this way, firmly holds the guide weight rollers 6a, 6b themselves owing to corresponding mechanical clamping. For example, it is possible in corresponding embodiments for the blocking log 16 to come to bear laterally against the axial outer side of the adjacent guide weight roller 6a, 6b. In this embodiment too, the position of the blocking log 26 along the inward direction $B_E$ with respect to the box or the outward direction $B_A$ with respect to the box may be selected in a variable manner. In the position shown, the blocking log 26 again secures the guide weight rollers 6a, 6b in the region of their end position $E_E$ inwards with respect to the box. Upon rotation of the threaded control rod 25 at its actuation end 25a by the user, the blocking log 26 again moves transversely with respect to the longitudinal direction of the threaded control rod 25, in this case however in a plane parallel to the roller rotational axis $D_R$. This may be realized for example in that the blocking log 26 is constructed from two log halves, or log plates, which are movable with respect to one another via an inclined surface coupling.

In a realization shown in FIG. 11, the roller blocking device comprises an axially movable control rod 27 and a blocking element which is movable by the rod 27 between a blocking element release position $B_F$ and a blocking element blocking position $B_B$. In the exemplary embodiment shown, the blocking element is formed by a spring tongue element 28 which is held in the hose guiding box 1 or the box housing 3 in a manner preloaded in its blocking position. The control rod 27 extends from an actuation end outwards with respect to the box 27a on an operating side of the hose guiding box 1 to a control section inwards with respect to the box 27b, with which the spring tongue element 28 cooperates, wherein it engages into the roller rotational axis guiding path $F_W$ of the guide weight rollers 6a, 6b in a blocking manner in the blocking element blocking position $B_B$ shown.

Axial actuation of the control rod 27 allows the user to move the spring tongue element 28 between its release position and its blocking position. If the control rod 27 is pushed forwards axially, that is to say downwards in FIG. 11, by the user, the control rod 27 presses, with its control section inwards with respect to the box 27b, the spring tongue element 29 counter to the spring force thereof (obliquely downwards in FIG. 11) from the roller rotational axis guiding path $F_W$ into its blocking element release position $B_F$. Correspondingly, the guiding path $F_W$ is then released for the guide weight rollers 6a, 6b or the roller rotational axes $D_R$ thereof, and the guide weight rollers 6a, 6b are again unblocked. In this embodiment too, the spring tongue element 28 may, as desired, be arranged at any location along the roller rotational axis guiding path $F_W$ where the blocking for the guide weight rollers 6a, 6b is to be brought about.

As is made clear by the exemplary embodiments which are shown and which are explained further above, the invention very advantageously provides a pull-out hose guiding device by way of which the hose bends of a pull-out hose can be guided in a hose guiding box using a guide weight roller arrangement, and the guide weight roller arrangement can be transferred into a blocking position which prevents one or more guide weight rollers from falling out of the hose guiding box or the rollers from performing undesirably large translatory movement within the hose guiding box. The pull-out hose guiding device can be used anywhere where there is a requirement for being able to guide in a controlled manner a pull-out hose having one or more hose bends, in particular for sanitary shower devices, but also for non-sanitary shower devices and further sanitary and non-sanitary applications.

Although the invention has been described in detail with reference to certain preferred embodiments, variations and modifications exist within the spirit and scope of the invention as described and defined in the following claims.

The invention claimed is:

1. A pull-out hose guiding device for guiding a pull-out hose having at least one hose bend of variable hose bend length, comprising:
   a hose guiding box configured for accommodating the hose bend in an anti-twist manner in a box-inwards hanging position;
   a guide weight roller arrangement including at least one guide weight roller which is insertable into a bend reversal region of the hose bend for rotary motion about a roller rotational axis, wherein the guide weight roller with its roller rotational axis is capable of translational motion in a hose bend lengthwise direction box-outwards with decreasing hose bend length and box-inwards with increasing hose bend length; and
   a roller blocking device which releases the guide weight roller in its translational motion in a roller release condition and blocks the guide weight roller against further movement at least in a box-outwards direction beyond a roller blocking position in a roller blocking condition, wherein the roller blocking position is spaced box-inwards from a box-outwards end position of the guide weight roller, the box-outwards end position corresponding to a minimum hose bend length,
   wherein the roller blocking device comprises a blocking bracket coupled with the roller rotational axis for conjoint translational motion and having a bracket section for engaging behind the hose bend in its bend reversal region on a lower side of the hose bend so as to extend with its bracket section below a bottom side of the bend reversal region.

2. The pull-out hose guiding device according to claim 1, wherein the roller blocking position is a box-inwards end position of the guide weight roller or has a distance from the box-inwards end position that is at most as great as half the distance of the box-inwards end position from the box-outwards end position of the guide weight roller.

3. The pull-out hose guiding device according to claim 1, wherein a plurality of guide weight rollers for a corresponding plurality of hose bends of the pull-out hose is provided and the blocking bracket and its bracket section are configured for engaging behind a plurality of the hose bends in their bend reversal regions on a lower side thereof.

4. The pull-out hose guiding device according to claim 3, wherein for at least two of the guide weight rollers a common rotation bearing unit is provided and the blocking bracket comprises a central web section coupled to the common rotation bearing unit with an end region, which central web section extends between two of the at least two guide weight rollers, and comprises, as the bracket section, two bracket subsections protruding in opposite directions on another end region of the central web section.

5. The pull-out hose guiding device according to claim 1, wherein the pull-out hose guiding device is configured to guide a pull-out hose of a sanitary shower.

6. A pull-out hose guiding device for guiding a pull-out hose having at least one hose bend of variable hose bend length, comprising:
   a hose guiding box configured for accommodating the hose bend in an anti-twist manner in a box-inwards hanging position;
   a guide weight roller arrangement including at least one guide weight roller which is insertable into a bend reversal region of the hose bend for rotary motion about a roller rotational axis, wherein the guide weight roller with its roller rotational axis is capable of translational motion in a hose bend lengthwise direction box-outwards with decreasing hose bend length and box-inwards with increasing hose bend length; and
   a roller blocking device which releases the guide weight roller in its translational motion in a roller release condition and blocks the guide weight roller against further movement at least in a box-outwards direction beyond a roller blocking position in a roller blocking condition, wherein the roller blocking position is spaced box-inwards from a box-outwards end position of the guide weight roller, the box-outwards end position corresponding to a minimum hose bend length wherein the roller blocking device comprises:
- a pivotable pivot lever which extends from a box-outwards actuating end on an operating side of the hose guiding box to a box-inwards blocking section and is pivotable between a blocking element release position and a blocking element blocking position, the blocking section of the pivot lever in the blocking element blocking position engages in a blocking manner in a roller rotational axis guiding path of the guide weight roller so as to block the guide weight roller with its rotational axis against said translational motion along the roller rotational axis guiding path in the hose bend lengthwise direction; or
- a rotatable threaded control rod and a blocking element movable by the rod between a blocking element release position and a blocking element blocking position, the threaded control rod extending from a box-outwards actuating end on an operating side of the hose guiding box to a box-inwards threaded section and the blocking element cooperating with the box-inwards threaded section of the threaded control rod; or
- an axially movable control rod and a blocking element movable by the rod between a blocking element release position and a blocking element blocking position, the control rod extending from a box-outwards actuating end on an operating side of the hose guiding box to a box-inwards control section, and the blocking element cooperating with the box-inwards control section of the control rod, and, in the blocking element blocking position, engaging in a blocking manner in a roller rotational axis guiding path of the guide weight roller.

7. The pull-out hose guiding device according to claim 6, wherein the roller blocking device comprises the rotatable threaded control rod and the blocking element or the axially movable control rod and the blocking element; and wherein the blocking element comprises a blocking bolt which, in the blocking element blocking position, engages in a blocking manner in a roller rotational axis guiding path of the guide weight roller.

8. The pull-out hose guiding device according to claim 6, wherein the roller blocking device comprises the rotatable threaded control rod and the blocking element or the axially movable control rod and the blocking element and wherein the blocking element comprises a blocking log which, in the blocking element blocking position, abuts in a blocking manner against a roller surface of the guide weight roller.

9. The pull-out hose guiding device according to claim 6, wherein the pull-out hose guiding device is configured to guide a pull-out hose of a sanitary shower.

10. The pull-out hose guiding device according to claim 6, wherein the roller blocking position is a box-inwards end position of the guide weight roller or has a distance from the box-inwards end position that is at most as great as half the distance of the box-inwards end position from the box-outwards end position of the guide weight roller.

11. The pull-out hose guiding device according to claim 6, wherein the pull-out hose guiding device is configured to guide a pull-out hose of a sanitary shower.

12. A sanitary shower, comprising:
- a shower head unit;
- a pull-out hose to which the shower unit is coupled, the pull-out hose having at least one hose bend of variable hose bend length; and
- a pull-out hose guiding device for guiding the pull-out hose, the pull-out hose guiding device comprising:
  - a hose guiding box configured for accommodating the hose bend in an anti-twist manner in a box-inwards hanging position;
  - a guide weight roller arrangement including at least one guide weight roller which is insertable into a bend reversal region of the hose bend for rotary motion about a roller rotational axis, wherein the guide weight roller with its roller rotational axis is capable of translational motion in a hose bend lengthwise direction box-outwards with decreasing hose bend length and box-inwards with increasing hose bend length; and
  - a roller blocking device which releases the guide weight roller in its translational motion in a roller release condition and blocks the guide weight roller against further movement at least in a box-outwards direction beyond a roller blocking position in a roller blocking condition, wherein the roller blocking position is spaced box-inwards from a box-outwards end position of the guide weight roller, the box-outwards end position corresponding to a minimum hose bend length,
wherein the roller blocking device comprises a blocking bracket coupled with the roller rotational axis for conjoint translational motion and having a bracket section for engaging behind the hose bend in its bend reversal region on a lower side of the hose bend so as to extend with its bracket section below a bottom side of the bend reversal region.

* * * * *